United States Patent
Oga et al.

(10) Patent No.: US 8,624,114 B2
(45) Date of Patent: Jan. 7, 2014

(54) WIRING HARNESS

(75) Inventors: Tatsuya Oga, Kosai (JP); Hidehiro Ichikawa, Kosai (JP); Takeshi Ogue, Kosai (JP)

(73) Assignee: Yazaki Corporation, Tokyo (JP)

(*) Notice: Subject to any disclaimer, the term of this patent is extended or adjusted under 35 U.S.C. 154(b) by 400 days.

(21) Appl. No.: 12/461,642

(22) Filed: Aug. 19, 2009

(65) Prior Publication Data
US 2010/0045106 A1 Feb. 25, 2010

(30) Foreign Application Priority Data
Aug. 19, 2008 (JP) .................... 2008-210250

(51) Int. Cl.
*H01B 3/00* (2006.01)

(52) U.S. Cl.
USPC ...................... 174/72 R; 174/72 A

(58) Field of Classification Search
USPC ........... 174/68.3, 69, 72 A, 70 R, 72 R, 72 C; 138/121, 128, 156, 157
See application file for complete search history.

(56) References Cited

U.S. PATENT DOCUMENTS

| | | | | |
|---|---|---|---|---|
| 5,367,126 A * | 11/1994 | Kikuchi | ...................... | 174/71 R |
| 5,962,814 A * | 10/1999 | Skipworth et al. | ............ | 174/135 |
| 6,051,789 A * | 4/2000 | Kato | ............................ | 174/68.3 |
| 6,494,523 B2 * | 12/2002 | Kobayashi | ..................... | 296/155 |
| 6,566,603 B2 * | 5/2003 | Doshita et al. | ............... | 174/72 A |
| 6,570,093 B2 * | 5/2003 | Doshita et al. | ............... | 174/72 A |
| 6,596,941 B2 * | 7/2003 | Tripoli | ......................... | 174/68.1 |
| 7,075,011 B1 * | 7/2006 | Kogure et al. | ............... | 174/72 A |
| 7,402,750 B2 * | 7/2008 | Daub et al. | .................. | 174/72 A |
| 2001/0004022 A1 * | 6/2001 | Kobayashi | ................... | 174/72 A |
| 2002/0014348 A1 * | 2/2002 | Aoki et al. | .................... | 174/72 A |
| 2005/0092512 A1 * | 5/2005 | Kogure et al. | ............... | 174/72 A |
| 2005/0247826 A1 * | 11/2005 | Tadokoro | ........................ | 248/49 |
| 2007/0252435 A1 * | 11/2007 | Coe et al. | ..................... | 307/10.1 |

FOREIGN PATENT DOCUMENTS

JP 2003-291747 10/2003

* cited by examiner

*Primary Examiner* — William H Mayo, III
(74) *Attorney, Agent, or Firm* — Edwards Wildman Palmer LLP; James E. Armstrong, IV; Stephen D. LeBarron

(57) ABSTRACT

A buffering part 34 is formed by turning an end side of a wiring harness 30 in a U-shape, and by detachably holding a neighbor of an end of the wiring harness 32 with a retainer 29 of a protector 24 disposed on a middle of the wiring harness 33. A circular portion of the buffering part 34 can work as a buffer. The buffer performance of the buffering part 34 depends on flexibility and resiliency of a corrugate tube 25 and on a circular shape formed between a holding position of the retainer 29 and the neighbor of the end of the wiring harness 32.

3 Claims, 2 Drawing Sheets

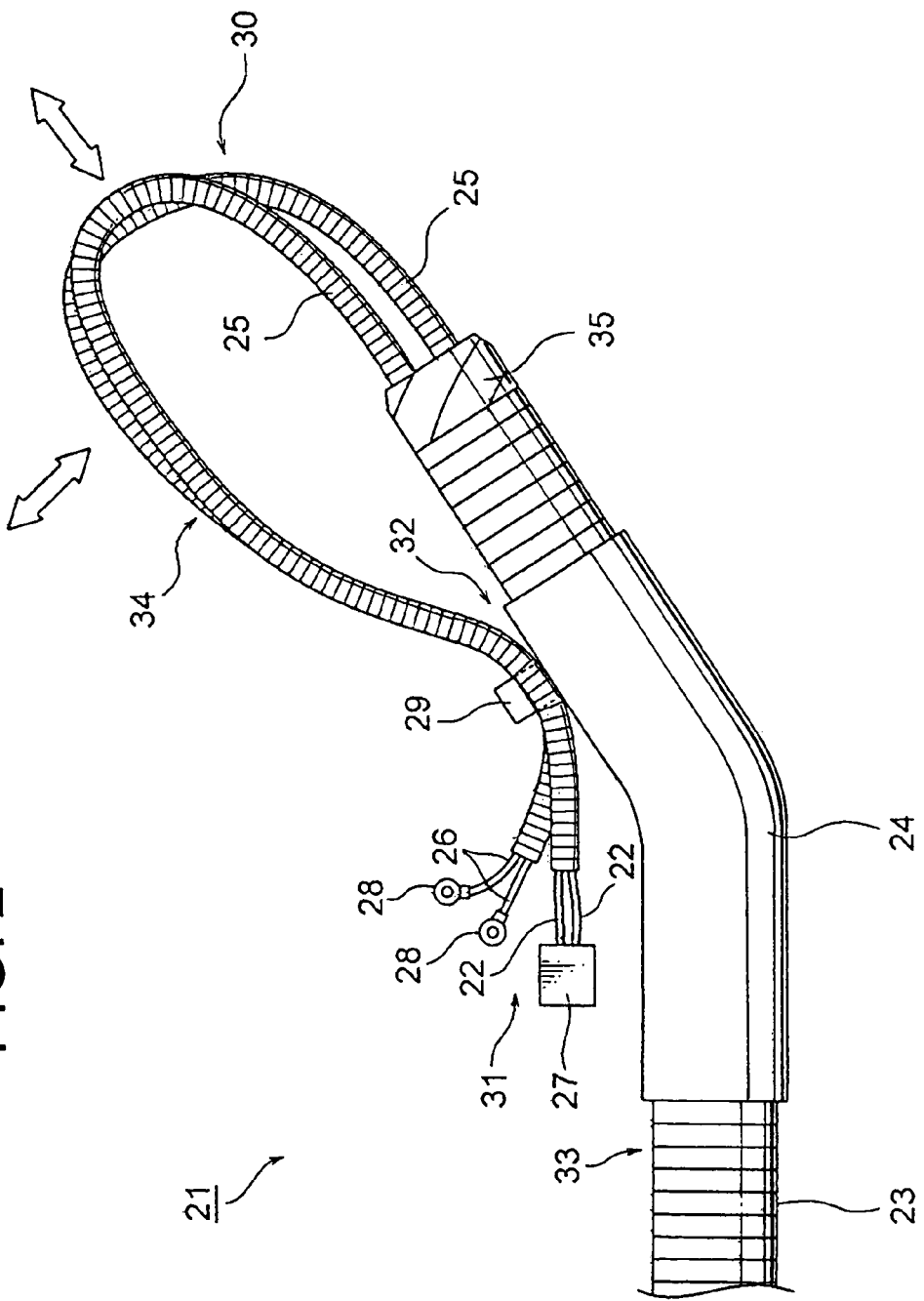

WIRING HARNESS

CROSS REFERENCE TO RELATED APPLICATIONS

This application is on the basis of Japanese Patent Application No. 2008-210250, the contents of which are hereby incorporated by reference.

BACKGROUND OF THE INVENTION

1. Field of the Invention

The present invention relates to a wiring harness arranged in a vehicle or the like.

2. Description of the Related Art

Patent Document 1 listed below discloses a wiring harness technique suggested by the applicant of the present application. In particular, a structure for preventing a slack of the wiring harness which affects transportability of the wiring harness. Preventing a slack causes a prevention of damage at an end of the wiring harness, and improves the transportability.

[Patent Document 1] Japanese Published Patent Application No. 2003-291747

If the slack is prevented by applying the disclosed technique of Patent Document 1, the end of the wiring harness (i.e. connector) can be prevented from being damaged. However, in case of a long wiring harness, there is a possibility to damage the wiring harness other than the end part of the wiring harness (connector) during from production of the wiring harness, through transportation to a car maker, to arranging in a vehicle.

As a long wiring harness, for example, there is a wiring harness for a hybrid vehicle or an electric car extending from a front side of an inner vehicle body of the vehicle through an under floor of the vehicle at an outside of a vehicle frame to a rear side of the inner vehicle body.

Accordingly, an object of the present invention is to provide a wiring harness of which end part and the other parts are hard to be damaged.

SUMMERY OF THE INVENTION

In order to attain the object, according to the present invention, there is provided a wiring harness including: a circular portion as a buffer formed by turning a corrugate tube in a U-shape and by detachably holding an end of the wiring harness or a neighbor of the end of the wiring harness at a middle of the wiring harness.

Therefore, the buffer performance depends on flexibility and resiliency of a corrugate tube and on a circular shape formed between a holding position and the end side of the wiring harness. In the present invention, the circular portion is used as a buffer. The buffer is formed, for example, during from production of wiring harness, through transportation to a carmaker, to arranging in a vehicle.

Thus, owing to the buffer, the wiring harness of the present invention is harder to be damaged than the conventional wiring harness.

Preferably, the wiring harness further includes: a retainer or a binding member as a wiring harness accessory provided at the middle of the wiring harness for detachably holding the end of the wiring harness or the neighbor of the end of the wiring harness.

Therefore, using a retainer as a wiring harness accessory reduces the number of parts of the wiring harness. On the other hand, using the banding member repeatedly reduces the cost of the wiring harness.

Thus, the wiring harness of the present invention is not only hard to be damaged, but also cost-effective.

Preferably, the wiring harness further including:

a plurality of high-voltage electrical power lines extending from a front side of an inner vehicle body of a hybrid vehicle or an electric vehicle through an under floor of the vehicle at an outside of a vehicle frame to a rear side of the inner vehicle body for connecting a battery and an inverter or for connecting a motor and an inverter;

a protector for protecting together middle parts of the high-voltage electrical power lines; and the corrugate tube composing the buffer.

Therefore, the buffer is applied to a long wiring harness for a hybrid vehicle or an electric vehicle.

Thus, the long wiring harness of the present invention is hard to be damaged.

These and other objects, features, and advantages of the present invention will become more apparent upon reading of the following detailed description along with the accompanied drawings.

BRIEF DESCRIPTION OF THE DRAWINGS

FIG. 2 is an enlarged view of a buffer of the wiring harness.

DETAILED DESCRIPTION OF THE PREFERRED EMBODIMENTS

Figure 1:
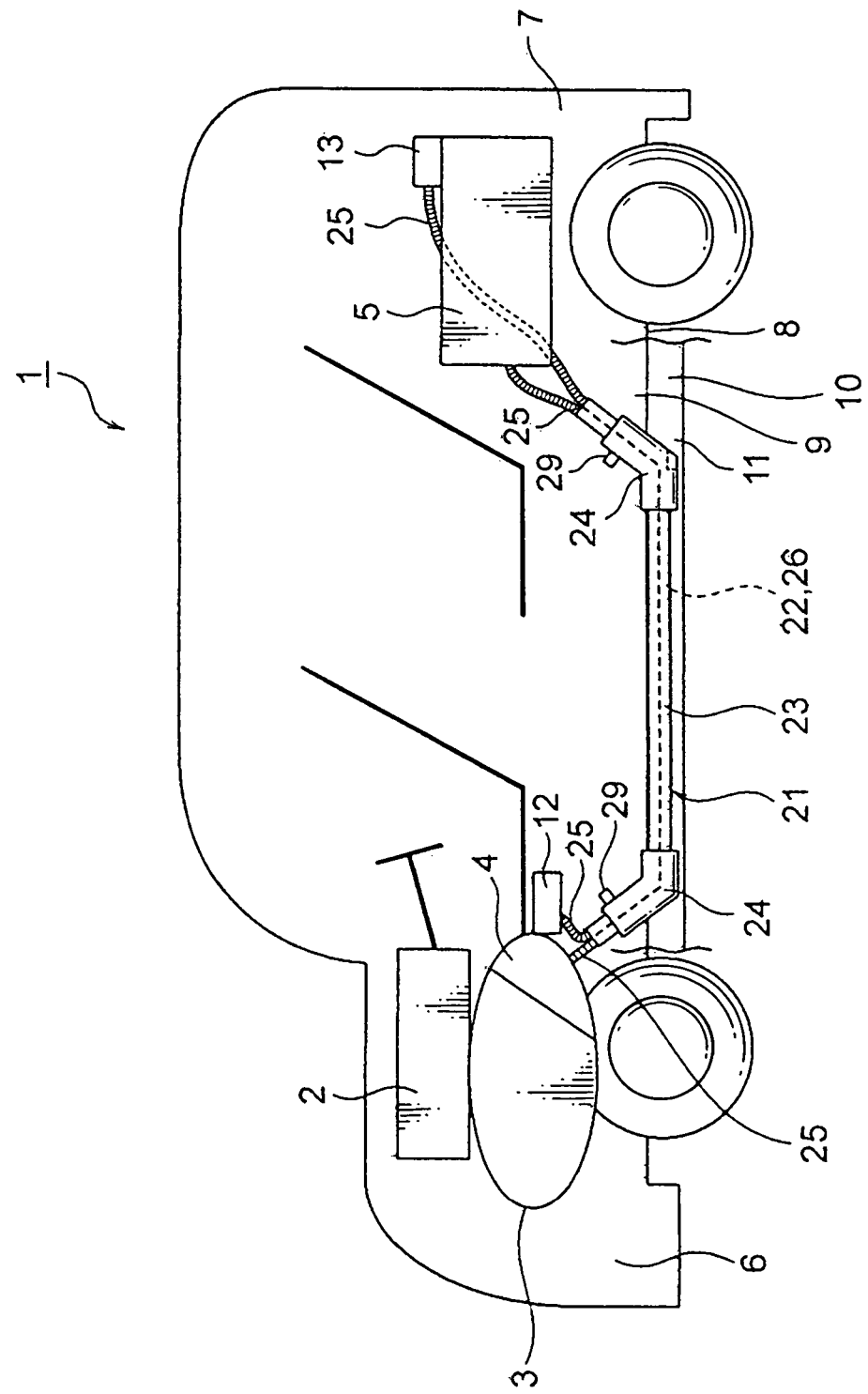
FIG. 1 is a schematic view showing an embodiment of a wiring harness according to the present invention.

A wiring harness according to the present invention will be explained with reference to figures.

A wiring harness of this embodiment is used in a hybrid vehicle or an electric vehicle. Hereafter, a case that the wiring harness is used in the hybrid vehicle is explained. (In a case of the electric vehicle, a structure, a configuration, and an effect of the wiring harness are basically the same.)

In FIG. 1, a reference numeral 1 indicates a hybrid vehicle. The hybrid vehicle 1 mixes driving forces of an engine 2 and a motor 3. A battery 5 supplies an electric power to the motor 3 via an inverter 4. In this embodiment, the engine 2, the motor 3, and the inverter 4 are mounted on a front side of an inner vehicle body where front wheels are disposed. Further, the battery 5 is mounted on a rear side of the inner vehicle body where rear wheels are disposed.

A reference numeral 8 indicates a vehicle body frame. In FIG. 1, an upper side of the vehicle body frame 8 indicates a vehicle upper floor 9. Further, a lower side of the vehicle body frame 8 indicates a vehicle under floor 10. A reinforcement 11 having a substantially convex section for reinforcing a vehicle body is arranged in the under floor 10. The reinforcement 11 extends from a front side to the rear side of the vehicle. A reference numeral 12 at a front side 6 of the inner vehicle body indicates a commonly-known electric junction box such as a relay box. Further, a reference numeral 13 at a rear side 7 of the inner vehicle body indicates a commonly-known low-voltage battery. (An arrangement of the low-voltage battery 13 is shown as an example.)

In this embodiment, the motor 3 includes a motor and a generator. Further, the inverter 4 includes an inverter and a converter. The inverter 4 is an inverter assembly and includes an inverter for an air conditioner, an inverter for a generator, and an inverter for a motor. The battery 5 is a Ni-MH system, a Li-ion system or the like, and is a battery module. Incidentally, a capacitor can be used instead of the battery.

A wiring harness 21 produced according to a method of the present invention connects the inverter 4 and the battery 5.

The wiring harness 21 according to the present invention includes: a plurality of high-voltage electrical power lines 22 for electrically connecting the inverter 4 and the battery 5; a flat corrugate tube 23 (protecting member) for protecting together the high-voltage power lines 22; a protector 24 (wiring harness accessory) for fixing the wiring harness to the vehicle body; a plurality of corrugate tubes 25 interposed between an end of the flat corrugate tube 23 (later-described one opening and the other opening) and an end of the wiring harness (later-described connector).

In this embodiment, the wiring harness 21 also includes a plurality of commonly-known low-voltage electric wires 26. (In this embodiment, because the low-voltage battery 13 is disposed at the rear side 7 of the inner vehicle body, the wiring harness 21 includes the low-voltage electric wires 26. In this embodiment, the low-voltage battery 13 is a battery module.)

The wiring harness 21 extends from the front side 6 of the inner vehicle body via the vehicle under floor 10 to the rear side 7 of the inner vehicle body. The wiring harness 21 penetrates the vehicle body frame 8. Hereunder, components of the wiring harness 21 will be explained.

The high-voltage power lines 22 are commonly-known power cables each having a circular section and a predetermined diameter. The high-voltage power lines 22 are wider than the low-voltage electric wires 26. A conducting body disposed at the center of the high-voltage power line 22 is made of copper, copper alloy, aluminum or the like. In this embodiment, two high-voltage power lines 22 are provided. Further, a connector 27 (see FIG. 2) having terminal fittings for connecting to electric components is disposed at ends of the high-voltage power lines 22. Incidentally, the high-voltage power lines 22 may include a braided wire for shielding the high-voltage power lines 22. (A braided wire may shield together a plurality of the high-voltage power lines 22.)

The low-voltage electric wires 26 are protected by the flat corrugate tube 23 together with the high-voltage power lines 22. One ends of the low-voltage electric wires 26 are connected to the electric junction box 12, and the other ends of the low-voltage electric wires 26 are connected to the low-voltage battery 13. A connector (not shown) for connecting to the electric junction box 12 and terminal fittings 28 (see FIG. 2) for connecting to the low-voltage battery 13 are disposed at ends of the low-voltage electric wires 26.

In FIGS. 1 and 2, the flat corrugate tube 23 for protecting the high-voltage power lines 22 and the low-voltage electric wires 26 has a noncircular (here, ellipse) section, and is made of insulating synthetic resin. The flat corrugate tube 23 is formed in an accordion shape having hills and valleys extending alternately along an axis of the flat corrugate tube 23. Incidentally, in this embodiment, the flat corrugate tube 23 is used. However, the present invention is not limited to this. A corrugate tube having a circular section can be used.

The flat corrugate tube 23 is formed in a seamless shape having no slit in the axial direction thereof. The high-voltage power lines 22 and the low-voltage electric wires 26 are inserted into the flat corrugate tube 23 from one opening toward the other opening of the flat corrugate tube 23.

In this embodiment, a common corrugate tube having a slit is not used. Because there is a possibility that splashing water enters the corrugate tube through the slit when a vehicle runs. Further, there is a possibility that the slit is open when the corrugate tube having the slit is bent, and a skipping stone may affect a wiring condition of the wiring harness when the vehicle runs.

In FIG. 1, the protector 24 is used as a fixing member to fix the wiring harness 21 onto the vehicle body. (A commonly-known clip may be used.) The protector 24 is made of insulating synthetic resin, and assembled at, for example, a neighbor of an end of the flat corrugate tube 23. A retainer 29 for holding a neighbor of an end of the wiring harness is formed on the protector 24 (see FIG. 2). The retainer 29 is resilient, and formed in a hook shape in this embodiment. (The shape of the retainer is shown as an example.)

In FIG. 2, as described the above, the corrugate tubes 25 are interposed from the end of the flat corrugate tube 23 to the connector 27 as a later-described end of the wiring harness, and the terminal fittings 28. The corrugate tubes 25 are made of insulating synthetic resin, and one of the corrugate tube 25 protects the high-voltage power lines 22, and the other protects the low-voltage electric wires 26. The corrugate tubes 25 are flexible and resilient. Further, the corrugate tube 25 has an accordion shape, and has a circular section.

Here, parts of the wiring harness 21 are defined as below. A part where the corrugate tubes 25 are provided is defined as an end side of the wiring harness 30. A part where the connector 27 and the terminal fittings 28 are provided is defined as an end of the wiring harness 31. A neighbor of the end of the wiring harness 31 is defined as a neighbor of an end of the wiring harness 32. A part where the flat corrugate tube is provided is defined as a middle of the wiring harness 33.

In FIG. 2, a buffer 34 for preventing the wiring harness 21 from being damaged during from production of wiring harness, through transportation to a carmaker, to arranging in a hybrid vehicle 1 is formed in the wiring harness 21.

The buffer 34 is formed by turning the end side of the wiring harness 30 in a U-shape, and by detachably holding the neighbor of the end of the wiring harness 32 with the retainer 29 of the protector 24 provided on the middle of the wiring harness 33. A circular shape of the buffer 34 works as a buffer. The buffer 34 works as a buffer with the flexibility and the resiliency of the corrugate tubes 25, and with a circular shape between the holding position and the neighbor of the end of the wiring harness 32.

Regarding the buffer 34, for example, a detachable bonding member such as a surface fastener can be used instead of the retainer 29. In the buffer 34, a reference numeral 35 indicates taping.

As above described with reference to FIGS. 1 and 2, according to the present invention, by forming the buffer 34, a slack of the end of the wiring harness 31 is prevented. Therefore, the end of the wiring harness 31 is prevented from being damaged. Portability of the wiring harness 21 is improved. Further, owing to the buffer 34, parts other than the end of the wiring harness 31 also are hard to be damaged.

The buffer 34 of the present invention can be adopted to a typical wiring harness other than those of a hybrid vehicle 1 or an electric vehicle.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:
1. A wiring harness comprising:
a circular portion, acting as a buffer, formed by a corrugate tube exiting a protector around the wiring harness and then turned into a U-shape by detachably holding an end of the corrugate tube including the wiring harness or a neighbor of the end of the wiring harness against protector in order to retain the corrugate tube in the U-shape, the end of the corrugate tube held against the protector, an end opposite to that which the corrugate tube exits the protector, and a retainer fixedly attached to the protector to detachably hold the end of the corrugate tube including the wiring harness or the neighbor of the end of the wiring harness, the retainer formed on the protector prior to a portion where the corrugate tube exits the protector.

2. The wiring harness as claimed in claim 1, further comprising:

a plurality of high-voltage electrical power lines extending from a front side of an inner vehicle body of a hybrid vehicle or an electric vehicle through an under floor of the vehicle at an outside of a vehicle frame to a rear side of the inner vehicle body for connecting a battery and an inverter or for connecting a motor and an inverter;

a protector for protecting together middle parts of the high-voltage electrical power lines; and the corrugate tube composing the buffer.

3. The wiring harness as claimed in claim 1, further comprising:

a plurality of high-voltage electrical power lines extending from a front side of an inner vehicle body of a hybrid vehicle or an electric vehicle through an under floor of the vehicle at an outside of a vehicle frame to a rear side of the inner vehicle body for connecting a battery and an inverter or for connecting a motor and an inverter;

a protector for protecting together middle parts of the high-voltage electrical power lines; and the corrugate tube composing the buffer.

* * * * *